United States Patent [19]

Finucane

[11] 4,009,292
[45] Feb. 22, 1977

[54] EFFERVESCENT DIPEPTIDE SWEETENER TABLETS

[75] Inventor: Thomas P. Finucane, Hartsdale, N.Y.

[73] Assignee: General Foods Corporation, White Plains, N.Y.

[22] Filed: Feb. 26, 1975

[21] Appl. No.: 553,416

[52] U.S. Cl. .............................. 426/548; 426/103; 426/591; 426/285; 426/454
[51] Int. Cl.² .......................................... A23L 1/236
[58] Field of Search ............ 426/96, 103, 548, 591, 426/454, 285

[56] References Cited

UNITED STATES PATENTS

| | | | |
|---|---|---|---|
| 2,803,551 | 8/1957 | Helgren | 426/548 |
| 2,900,258 | 8/1959 | Wagner | 426/591 X |
| 2,984,543 | 5/1961 | Smith et al. | 426/96 X |
| 3,359,119 | 12/1967 | Milton | 426/96 X |
| 3,667,962 | 6/1972 | Fritzberg et al. | 426/591 |
| 3,753,739 | 8/1973 | Cella et al. | 426/548 |
| 3,761,288 | 9/1973 | Glicksman et al. | 426/548 |

FOREIGN PATENTS OR APPLICATIONS 7,207,426   1/1973   Netherlands

*Primary Examiner*—A. Louis Monacell
*Assistant Examiner*—Esther L. Massung
*Attorney, Agent, or Firm*—Richard Kornutik

[57] ABSTRACT

Combining a readily soluble form of L-aspartyl-L-phenyl methyl ester (APM) with an effervescent calcium carbonate system and citric acid, when compressed into tablet form, produces an effervescent APM tablet having superior solubility and stability and is devoid of characteristic lingering sweet aftertaste.

14 Claims, No Drawings

EFFERVESCENT DIPEPTIDE SWEETENER TABLETS

BACKGROUND OF THE INVENTION

The present invention relates to effervescent dipeptide sweetener tablets for use primarily as a table-top sweetener in beverage systems such as coffee and tea which tablets contain a calcium carbonate-containing, stable carbonation system, citric acid, and a soluble pre-fixed form of APM present at least partly as the sweetener. The effervescent APM tablet has a rate of solubility which is significantly better than APM alone or when compressed in a non-effervescent tablet. In addition, utilization of the quick-dissolving, stable form of APM (60% APM/40% Mor-Rex) with a dry carbonation system having excellent stability properties (50% $CaCO_3$/50% Mor-Rex) produces an APM tablet which is not only rapidly soluble in aqueous-based systems, but is stable on storage and undergoes no degradation and loss of sweetness when stored at room temperature for extended periods of time. Still further, the calcium carbonate has been found to be uniquely suited as a repressor of the characteristic lingering sweet aftertaste of APM.

The dipeptide sweetener now commonly known as APM and identified specifically as the methyl ester of L-aspartyl-L-phenylalanine is estimated to have 150 to 200 times the sweetness of sucrose on a weight to weight basis. Among the limitations of this dipeptide sweetener are slow rate of dissolution, limited stability in aqueous systems, and a lingering sweet aftertaste. The modes of decomposition of APM are not too fully understood, but it does appear that the reactions that stem from the presence of APM in moisture lead to an unfavorable interaction with other materials such as aldehydes and ketones and also lead to undesirable decomposition products resulting in, at times, significant loss in sweetness.

Several attempts at increasing the solubility of APM have involved improving its flowability by combining the dipeptide with other powderous materials such as citric acid. However, the flowability of APM in granular mixtures with citric acid and other beverage mix ingredients is poor in that it tends to bridge the remaining ingredients such that the mix will now flow readily or discharge through high-speed packaging equipment. Even when the dipeptide per se is ground, or it is co-ground with other materials serving as dispersants, the ultimate mix produced leaves much to be desired in terms of the flowability thereof by reason of the aforesaid properties of the dipeptide itself; the composition tends to pack or bridge and have a high angle of repose.

The solubility of APM was recently disclosed in U.S. Pat. No. 3,761,288 issued Sept. 25, 1973 and herein incorporated by reference as being significantly improved by co-drying the same with an edible bulking agent, specifically dextrin, having a dextrose equivalent (D.E.) of about 4 to 20, preferably 5 to 10. Although the advantages of the resultant composition having the flowability and appearance of sucrose are apparent, there are obvious hygroscopicity problems that may be encountered if the dextrin material does not have a sufficiently high molecular weight.

Although formation of an APM tablet would be thought to have improved solubility due to the increase in density and consequent "sinking" affect in beverages, (APM tends otherwise to "float" on the surface of beverages) compressed APM tablets have extremely poor solubility in cold water and in some instances, even in hot aqueous-based systems.

Netherlands Pat. No. 7,207,426 issued to Hoffman-LaRoche and Company, on June 1, 1972, teaches the preparation of an effervescent tablet containing from 0.1 to 10 weight % of L-aspartyl-L-3-phenylalanine methyl ester, pharmacodynamically active substances and sodium bicarbonate, the bicarbonate acting as the sole effervescent agent to produce a non-foaming sweet pharmaceutal tablet. However, while sodium bicarbonate is an effective carbonation agent, on storage it tends to react with various substances such as anhydrous citric acid which is desirably present in some liquid beverage systems. Consequently, the tablet of this reference is limited to dry pharmaceutical preparations.

SUMMARY OF THE INVENTION

In accordance with the present invention, a primary object is to provide a new product form for dipeptide sweeteners such as APM otherwise referred to as L-aspartyl-L-phenylalanine methyl ester specifically a tablet. The tablet is stable on storage, making it ideally suited for use as a table-top sweetener, is devoid of lingering sweet aftertaste and is readily soluble in aqueous-based systems. As a result, this tablet is not restricted for use as a sweetener for coffee, tea and the like but may be employed for example as the stable form of APM in dry, ready-to-mix beverage systems, in canned beverage systems wherein the tablet is kept separate from the liquid itself until the can is opened or in virtually any initially dry desirably sweet system which in its final form is a moisture content such that a readily soluble dipeptide sweetener is desirable.

It is a further object of the present invention to provide a low calorie, readily soluble tableted sweetener prepared with an amount of dry carbonation system effective to improve the solubility of the sweetener without imparting a carbonated character to the beverage to which it is added.

A further object of the invention is to provide a low calorie, readily soluble tableted sweetener devoid of lingering sweetness where the dry carbonation system is present in an effective amount.

These and other objects are accomplished according to the present invention which provides a tablet containing a co-dried 60/40 blend of APM/Mor-Rex with a separately dried Mor-Rec-coated calcium carbonate (50/50) and anhydrous citric acid and a method for preparing the same.

DETAILED DESCRIPTION OF THE INVENTION

The present invention contemplates combining and thereafter compressing into tablet form a soluble form of APM, specifically APM and/or a soluble salt of APM, fixed in Mor-Rex, with a dry carbonating system having excellent stability consisting essentially of calcium carbonate fixed in Mor-Rex, and anhydrous citric acid.

The dry carbonation source of the present invention is prepared according to the method of patent application Ser. No. 347,107, now U.S. Pat. No. 3,939,289 herein incorporated by reference. Essentially, this involves reducing the particle size of calcium carbonate in the presence of an aqueous solution of a carbohydrate material to form a colloidal suspension of the calcium carbonate in the aqueous solution; and then drying the colloidal suspension to provide a solid suspension of finely-divided calcium carbonate dispersed within a matrix of the carbohydrate. A 10 D.E. hydrolyzed cereal solid available commercially as Mor-Rex 1918 from Corn Products Corporation is particularly suitable for this carbonation system and henceforth reference will be made principally to this carbohydrate material. Similarly, a finely-divided, precipitated calcite having an average primary particle size of less than about 100 millimicrons, preferably less than about 40 millimicrons is desirable. This form of calcium carbonate is commercially available as "Purecal U" from Wyandotte Corporation. This dry carbonation source dissolves readily in aqueous solutions to give a crystal clear liquid with substantially no sediment making it uniquely suited for the purposes of this invention which is to provide a readily soluble and stable APM tablet of improved flavor and rate of solubility when placed in aqueous-based systems.

The relative amounts of the uniformly divided calcium carbonate and the Mor-Rex as to each other are presently not believed to be critical. As a guideline, the lower limits of calcium carbonate would be that amount effective to increase the solubility of the APM in final tablet form. As a guideline to the upper limit of the same, the calcium carbonate should not be present in so great an amount as to impart either a carbonated character or off-flavor to the beverage in which it is incorporated due to interaction with the APM. Usually, therefore, this means that the dry carbonation system will contain about 1:5 to 2:1 parts per cent Mor-Rex to calcium carbonate and more preferably a 1:1 parts per cent of the same to give a total calcium ion concentration in the fluid liquid beverage of less than 0.10% such that the volume of carbon dioxide gas released per volume of final liquid beverage is appreciably less than 1 and consequently not sufficient to lend a carbonated property to the beverage.

The readily soluble form of APM employed throughout this invention is APM, a soluble salt of APM, or combination thereof fixed in Mor-Rex resulting from a homogenous aqueous dispersion of these components having been co-dried. An important feature of this invention is the homogenization of the APM/Mor-Rex slurry prior to drying such that the particle size of the APM is reduced. The homogenization or micropulverization of this blend or slurry results in a thicker dispersion relative to APM and allows a larger amount of APM to be fixed in Mor-Rex than there is Mor-Rex present. Most importantly, however, fixation of APM and Mor-Rex prior to combining with the calcium carbonate system and/or anhydrous citric acid effectively shields the APM from any interaction which might ordinarily occur among these compounds had the APM, Mor-Rex, and calcium carbonate, or similarly anhydrous citric acid been combined in one uniform step. This results in a more stable system of improved sweetening properties due to absence of degradation of the dipeptide or interaction with the same.

The relative amounts of the dry carbonation system relative to the amount of APM/Mor-Rex is relatively well-defined since the amount of calcium carbonate defines the improvement in solubility of APM in addition to its ability to mask the lingering sweet aftertaste thereof without at the same time itself imparting a flavor quality of its own. Generally this means that, on a total weight basis, about twice as much of the carbonation system to the APM/Mor-Rex system is needed where the ratio by weight of calcium carbonate to Mor-Rex is 1:1 and that of the APM to Mor-Rex is 3:2 respectively. The amount of anhydrous citric acid necessary is that amount effective to react with the calcium carbonate which is ordinarily in excess of that amount present in conventional liquid beverage systems. This has generally been determined to be about 1.33 times the amount by weight of the total dry carbonation system present. Those skilled in the art on reading this disclosure will be able to adjust the amounts of each component relative to amount of the other components present.

While the APM/Mor-Rex dried homogenized slurry is itself a soluble system especially where a soluble salt of this dipeptide is employed as the sole dipeptide sweetener present, and therefore, might provide a soluble tablet in and of itself, the desirability of combining the APM/Mor-Rex with the dry carbonation system of this invention cannot be overestimated. The appreciable benefits derived in terms of solubility and rate of solubility not to speak of the improved flavor quality rendered to the dipeptide when the two systems are compressed into a tablet are so superior as to be unexpected.

Accordingly, a preferred embodiment of this invention is an APM tablet formulated by combining a 4:3:1.5 weight ratio of anhydrous citric acid to dry carbonation system (50% $CaCO_3$/50% Mor-Rex) to soluble APM (60% APM/40% Mor-Rex). Typically, this means that an APM tablet of a size conventionally associated with table-top tableted sweeteners (7/32 × ¼ inch diameter) will contain about 0.08g. anhydrous citric acid, 0.06g. of the dry carbonation system (0.3 g. $CaCO_3$/0.3 g. Mor-Rex) and 0.03 g. of the APM system (0.018g. APM/0.012g. Mor-Rex). For obtention of this size tablet, a pressure of less than 1,000 psig is required, but the tablet size is not critical. It is important to note that non-appreciable variances from the aforementioned ratios and amounts of each component are not critical so long as the aforementioned considerations are adhered to; namely, that 1) there is an effective amount of critic acid present to react with the calcium carbonate and improve upon the solubility of the APM system, and 2) the APM and Mor-Rex slurry is homogenized and dried prior to combining with the dry carbonation system in order to shield the APM from reacting with the calcium carbonate during storage.

For optimum storage stability, the tablets of the present invention may be stored in moisture impermeable containers. Typically, a hermetically sealed envelope of metal foil, a moisture impervious film of a vinyl chloride, or vinylidene chloride polymer or copolymer, or a combination thereof, will provide good protection. However, it is of course an added advantage of the present invention that the stable dry carbonation system employed in this invention increases the storage stability of the APM system and such added precautions are not essential where the duration of storage and conditions thereof are conventional for this type of product.

Similarly, for reasons of economy, and/or where a readily soluble synergistic sweetening tablet is desired, the APM may be partially substituted on a sweetness equivalent basis for soluble non-nutritive sweeteners such as saccharine, cyclamate and combinations thereof.

While reference has heretofore been made solely to the use of APM, those skilled in the art on reading this disclosure will be able to substitute any sweetener, especially a dipeptide sweetener or L-aspartic acid derivative sweetener where improved solubility, and in some instances improved sweetening properties, are desired.

The following examples are presented for the purpose of further illustrating and explaining the present invention and are not to be taken as limiting in any sense. Unless otherwise indicated, all parts and percentages are by weight.

EXAMPLE I

An aqueous solution containing 60 parts APM and 40 parts 10 D.E. Mor-Rex was co-spray dried in a Niro Spray Dryer at an air pressure of 5.2 kg.1 sq. cm., an air inlet temperature of 160° C, and an air outlet temperature of 75° C with a rate of solution flow of 15 cc./minute. 0.030 grams of the resultant dry material were set aside for incorporation into the tablet.

50.0 g. Purecal U calcium carbonate (average primary particle size being 33 to 40 millimicrons) is mixed with 50.0 g. Mor-Rex 1918 (10 D.E. hydrolyzed cereal solids) in 100.0 g. water. The colloidal mill gap is then set to No. 4 and the mixture recycled for 5 minutes to produce a milky dispersion of calcium carbonate. This dispersion is spray dried in a Niro dryer at an inlet temperature of 175° C. The resulting dry powder is passed through a 140 US mesh screen to remove large agglomerates and contaminants. The sample is then ground in a Mikro-Sauplmill hammermill (Slick Corp.) with a 0.01 herringbone slot retaining screen insert and passed through a 400 US mesh screen (0.038 mm.) to obtain a dry carbonation source for use in the present invention.

0.060 g. of the above carbonation source was then dry blended with the 0.03 g. of the APM system and 0.080 g. of anhydrous citric acid. After blending to obtain a homogenous dry powdered mixture, the total mix was placed in a die having a ¼ inch diameter.

The powder prior to compression occupied a height of 2 25/32 inches cubic inches and after compression at 50 pounds/in² (1000 psi), a height of 2 18/32 inches. The tablet had a dimension of 7/32 × ¼ inch diameter.

The tablet dissolved instantly in 1 – 8 oz. cup of hot coffee and in less than 1 minute in the same amount of cold water (44° F) with a minimum of stirring.

EXAMPLE II

The same method as in Example I is employed except that a 75/25 mixture of Purecol U calcium carbonate/10 D.E. Mor-Rex is employed.

What is claimed is:

1. An effervescent dipeptide sweetener tablet comprising a sweetening amount of a soluble dipeptide sweetener composition which sweetener composition consists essentially of a major amount of a dipeptide sweetener co-dried with a minor amount of hydrolyzed cereal solids; an amount of a dry carbonation system effective to increase the solubility of the dipeptide sweetener without, at the same time, imparting an undesirable aftertaste to the tablet, which carbonation system consists essentially of a major amount of calcium carbonate co-dried with a minor amount of hydrolyzed cereal solids; and an amount of anhydrous citric acid effective to react with the calcium carbonate, said calcium carbonate present in an amount sufficient to give a total calcium ion concentration in a fluid beverage of less than 0.10% such that the volume of $CO_2$ gas released per volume of the final liquid beverage is appreciably less than 1, and consequently not sufficient to lend a carbonated property to the beverage, the resultant tablet being one of increased solubility, stability, and devoid of lingering sweet aftertaste.

2. The tablet of claim 1 wherein the dipeptide sweetener is L-aspartyl-L-phenylalanine methyl ester.

3. The tablet of claim 2 wherein the soluble carbohydrate co-dried both with L-aspartyl-L-phenylalanine methyl ester and the calcium carbonate is 10 D.E. hydrolyzed cereal solids.

4. The tablet of claim 3 wherein the drying method employed is co-spray drying.

5. The tablet of claim 4 wherein the co-spray dried sweetener composition contains 60 parts L-aspartyl-L-phenylalanine methyl ester and 40 parts hydrolyzed cereal solids; the co-spray dried carbonation system contains 50 parts calcium carbonate and 50 parts hydrolyzed cereal solids; and anhydrous citric acid at 1.33 times the concentration of the carbonation system.

6. The tablet of claim 5 wherein the tablet contains 0.03 g. of L-aspartyl-L-phenylalanine methyl ester/ hydrolyzed cereal solids (60/40), 0.060 g. calcium carbonate (50/50) and 0.080 g. anhydrous citric acid.

7. The tablet of claim 6 wherein the dimensions of the tablet are 7/32 × ¼ inch.

8. The tablet of claim 1 wherein it is packaged in a moisture impermeable container.

9. A process for producing an effervescent dipeptide sweetener tablet which is readily soluble and has enhanced sweetness and stability which comprises combining a soluble form of a dipeptide sweetener, formed by homogenizing a slurry of hydrolyzed cereal solids and a dipeptide sweetener and drying, with a stable dry carbonation system containing calcium carbonate, said calcium carbonate present in an amount sufficient to give a total calcium ion concentration in a fluid beverage of less than 0.10% such that the volume of $CO_2$ gas released per volume of the final liquid beverage is appreciably less than 1, and consequently not sufficient to lend a carbonated property to the beverage, and anhydrous citric acid, the amount of sweetener present being effective to impart sweetness to the tablet, the amount of dry carbonation system present being effective to increase the solubility of the dipeptide sweetener without imparting an off taste to the resultant tablet; and the amount of anhydrous citric acid present being effective to react with the calcium carbonate.

10. The process of claim 9 wherein the soluble form of the dipeptide sweetener is 60 parts L-aspartyl-L-phenylalanine methyl ester co-dried with 40 parts 10 D.E. hydrolyzed cereal solids.

11. The process of claim 9 wherein the dry carbonation system consists essentially of up to 91 parts calcium carbonate co-dried with at least 9 parts 10 D.E. hydrolyzed cereal solids.

12. The process of claim 11 wherein the calcium carbonate and hydrolyzed cereal solids are present at a concentration of 50 parts each.

13. The process of claim 9 wherein the dimensions of the tablet are 7/32 × ¼ inch.

14. The process of claim 9 wherein it is packaged in a moisture impermeable container.

* * * * *